US009774907B1

(12) United States Patent
Bhageria et al.

(10) Patent No.: US 9,774,907 B1
(45) Date of Patent: Sep. 26, 2017

(54) TAILORED AUDIO CONTENT DELIVERY

(71) Applicant: INTERNATIONAL BUSINESS MACHINES CORPORATION, Armonk, NY (US)

(72) Inventors: Gopal K. Bhageria, Overland Park, KS (US); Vijay Ekambaram, Tamilnadu (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/090,811

(22) Filed: Apr. 5, 2016

(51) Int. Cl.
| | |
|---|---|
| H04H 60/33 | (2008.01) |
| H04N 21/439 | (2011.01) |
| H04N 21/485 | (2011.01) |
| H04N 21/45 | (2011.01) |
| H04N 21/482 | (2011.01) |
| H04N 21/4725 | (2011.01) |

(52) U.S. Cl.
CPC ....... *H04N 21/439* (2013.01); *H04N 21/4532* (2013.01); *H04N 21/4725* (2013.01); *H04N 21/482* (2013.01); *H04N 21/4852* (2013.01)

(58) Field of Classification Search
USPC ....................................................... 725/9, 12
See application file for complete search history.

(56) References Cited

U.S. PATENT DOCUMENTS

| | | | |
|---|---|---|---|
| 7,313,243 B2 | 12/2007 | Hsu | |
| 8,179,475 B2 | 5/2012 | Sandrew | |
| 8,428,621 B2 | 4/2013 | Vorbau et al. | |
| 8,516,374 B2 | 8/2013 | Fleischman et al. | |
| 8,854,447 B2 | 10/2014 | Conness et al. | |
| 9,143,880 B2 | 9/2015 | Vennstrom et al. | |
| 2013/0046847 A1* | 2/2013 | Zavesky | G06Q 30/0261 709/217 |
| 2013/0259312 A1 | 10/2013 | Lyons et al. | |

(Continued)

OTHER PUBLICATIONS

"Long-Range Laser Audio Surveillance Device", https://www.spycatheronline.co.uk/long-range-laser-listening-device.html.

(Continued)

*Primary Examiner* — Mulugeta Mengesha
(74) *Attorney, Agent, or Firm* — Ronald A. Kaschak; Matthew M. Hulihan; Heslin Rothenberg Farley & Mesiti PC

(57) ABSTRACT

Delivery of audio content is tailored to individual users. A viewing direction of a user to a display presenting a video stream showing a scene of an environment is determined. A physical location, in the environment, that the user is viewing in the scene is determined, and an audio stream, of several audio streams obtained from different physical locations in the environment, is identified that correlates to the determined physical location that the user is viewing. The identified audio stream is then provided to the user. Additional aspects include identifying potentially interesting areas from which audio streams are obtained and selectively triggered by users for provision to the users. Further aspects include an ability for a user to identify for other users a particular area that the user views to obtain interesting audio, informing the other users that the user is listening to interesting audio associated with that particular area.

19 Claims, 8 Drawing Sheets

(56) References Cited

U.S. PATENT DOCUMENTS

| | | | | |
|---|---|---|---|---|
| 2014/0362201 A1* | 12/2014 | Nguyen | ................... | H04R 3/00 |
| | | | | 348/78 |
| 2015/0146879 A1* | 5/2015 | Nguyen | ............... | H04R 1/1041 |
| | | | | 381/74 |
| 2016/0142774 A1* | 5/2016 | Sayyadi-Harikandehei | .... | H04N 21/4668 |
| | | | | 725/14 |

OTHER PUBLICATIONS

"CCTV Lens Field of View Calculator", http://www.supercircuits.com/resources/tools/fov-calculator, accessed Mar. 15, 2016.
"Field of View Calculator", https://www.pelco.com/partners/tools-calculators/camera-lens-field-of-view-calculator-fov, accessed Mar. 15, 2016.
"Easy Measure—Measure With Your Camera", https://itunes.apple.com/us/app/easymeasure-measure-your-camera!/d349530105?mt=8, accessed Mar. 15, 2016.
Deleforge et al., "Co-Localization of Audio Sources in Images Using Binaural Features and Locally-Linear Regression", Transactions on Audio, Speech, and Language Processing, vol. 23, No. 4, Apr. 2015, pp. 1-15.

* cited by examiner

TAILORED AUDIO CONTENT DELIVERY

BACKGROUND

In a typical situation involving a television or other system presenting a video with accompanying audio, the audio is a single audio stream heard by all viewing users. In some examples, such as with DVD movies, the audio track played along with the video is selectable, enabling selection of tracks with foreign language overdubs or expanded/enhanced audio channeling, as examples. However, even in these cases the audio stream presented to the viewers with the video content is one-dimensional in that all sounds are meshed together into the stream regardless of the number and nature of activities occurring in the scene. It does not account for the ability to tailor the audio delivered to the users depending on where in the scene the users have focused their attention. To the extent that a particular sound is to be heard by the users, the sound is included to the single audio stream that is played with the video. This results in a generalized audio stream where audio features from particular portions of the scene may be difficult to discern, requiring the content creator to make selections about the dominant sounds of the stream regardless of where the interests of the individual users lie.

SUMMARY

Shortcomings of the prior art are overcome and additional advantages are provided through the provision of a computer-implemented method that includes determining a viewing direction of a user to a display presenting a video stream showing a scene of an environment; based at least in part on the determined viewing direction of the user, determining a physical location, in the environment, that the user is viewing in the scene of the environment; identifying an audio stream, of a plurality of audio streams obtained from different physical locations in the environment, that correlates to the determined physical location that the user is viewing; and providing the identified audio stream to the user.

Further, a computer program product including a computer readable storage medium readable by a processor and storing instructions for execution by the processor is provided for performing a method that includes: determining a viewing direction of a user to a display presenting a video stream showing a scene of an environment; based at least in part on the determined viewing direction of the user, determining a physical location, in the environment, that the user is viewing in the scene of the environment; identifying an audio stream, of a plurality of audio streams obtained from different physical locations in the environment, that correlates to the determined physical location that the user is viewing; and providing the identified audio stream to the user.

Yet further, a computer system is provided that includes a memory and a processor in communications with the memory, wherein the computer system is configured to perform a method including: determining a viewing direction of a user to a display presenting a video stream showing a scene of an environment; based at least in part on the determined viewing direction of the user, determining a physical location, in the environment, that the user is viewing in the scene of the environment; identifying an audio stream, of a plurality of audio streams obtained from different physical locations in the environment, that correlates to the determined physical location that the user is viewing; and providing the identified audio stream to the user.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

While watching any of several different forms of video content, such as television (TV), streaming internet videos, live content, or pre-recorded content, the user is typically able to listen to only the audio content that is broadcasted along with video content. Using the example of watching TV, the user navigates through channels and selects a program. The program is delivered as a bundled audio stream and video stream. This is unbundled and provided to the user via a display for the video and speakers for the audio. For purposes of the description provided herein, the audio stream conventionally delivered with the video content is referred to as the "broadcasted" or "broadcast" audio stream. It should be understood that this is for purposes of explanation only, and does not imply that that the other audio streams that may be selectively heard by users in accordance with aspects described herein (in further below) are not to be regarded as "broadcasted".

As noted above, such a singular audio stream of a scene presents the audio that corresponds to everything presented in the scene. However, there may be several distinct areas of the scene with potentially different and interesting (to the user) audio associated therewith, as described with reference to FIG. 1.

Figure 1:
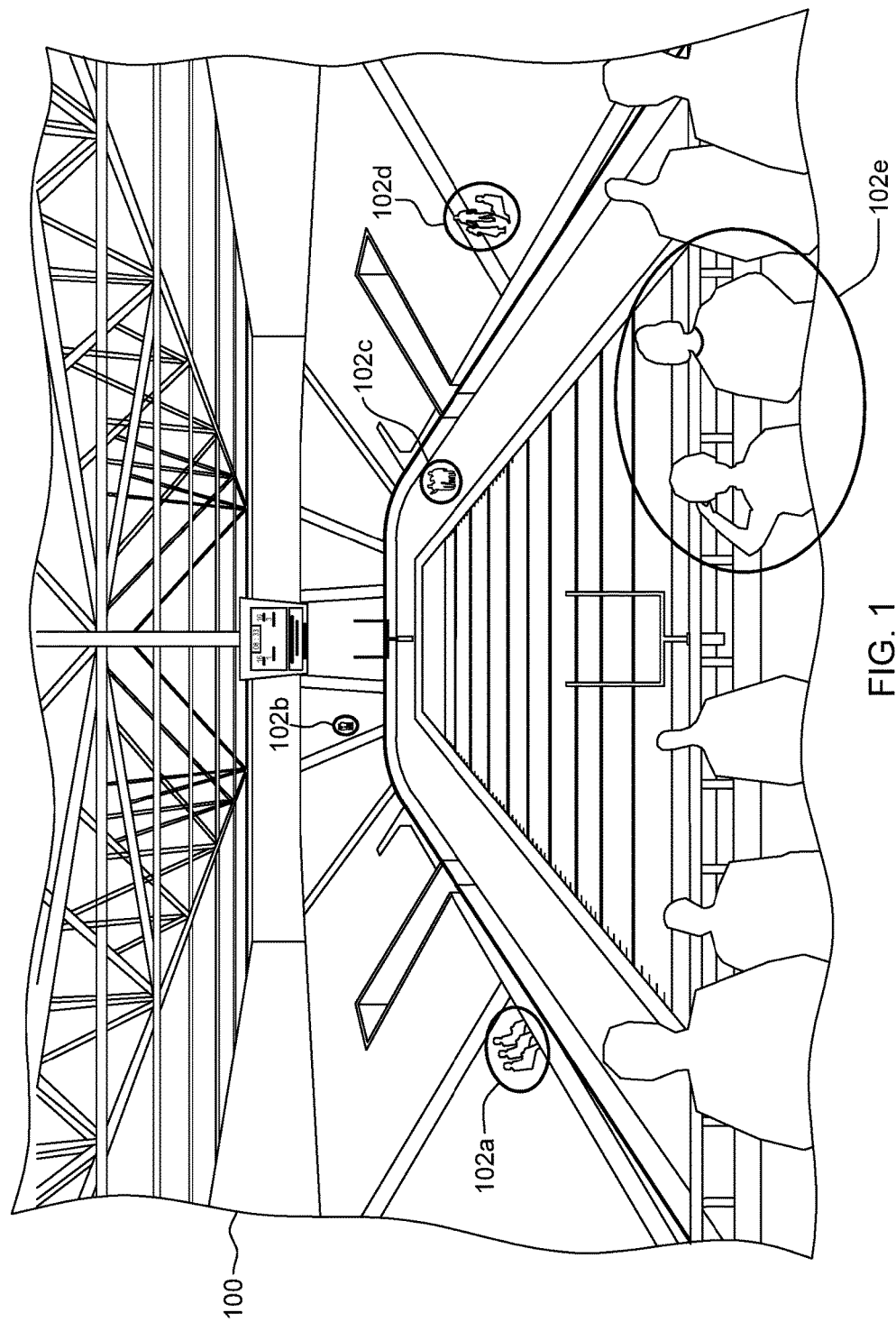
FIG. 1 depicts an example scene of an environment showing several distinct areas of the scene.

FIG. 1 presents a scene 100 of an environment. In this example, the scene is of a stadium in which a football game is underway. The scene presented in FIG. 1 is typical of what a user watching an American football game on TV would see presented in a single frame on the user's display. Along with the broadcasted video content showing the scene, the audio content assembled by the broadcaster is also broadcasted.

102a, 102b, 102c, 102d and 102e indicate several areas of the scene. Positioned at each area are individual attendees/participants. In this case, the areas correspond to different physical locations in the football stadium, most of which are different areas of the crowd. The sound experienced by a spectator physically located in the stadium at a given area (e.g. 102e) will differ from the sound experienced by a spectator physically located in the stadium at a different area (e.g. 102b). As an example, when the gameplay occurs close to the end zone nearest area 102e, the crowd in that area may hear player interaction and contact that occurs on the field, while the crowd at area 102b at the far side of the stadium may hear predominantly surrounding crowd noise and none of the player sounds heard by the crowd at 102e.

Accordingly, areas 102a-102e indicate physical locations in the environment that experience different sounds during the event. At any point in time, a user viewing the scene at home may be interested to listen selectively to audio content from different such area(s) of the scene, i.e. the audio experienced at one or more of those locations or other locations. As an example, if players were huddled on the field nearest area 102c in between plays of the game, a user may wish to listen to the sound heard by spectators at area 102c, rather than, for example, commentary customarily provided by network commentators and broadcast as part of the broadcast audio.

Described herein are facilities for tailored audio stream delivery by which users can selectively listen to any of different audio content from different areas of a depicted scene of video content. This can improve user immersion into the content and interaction therewith.

Figure 2:
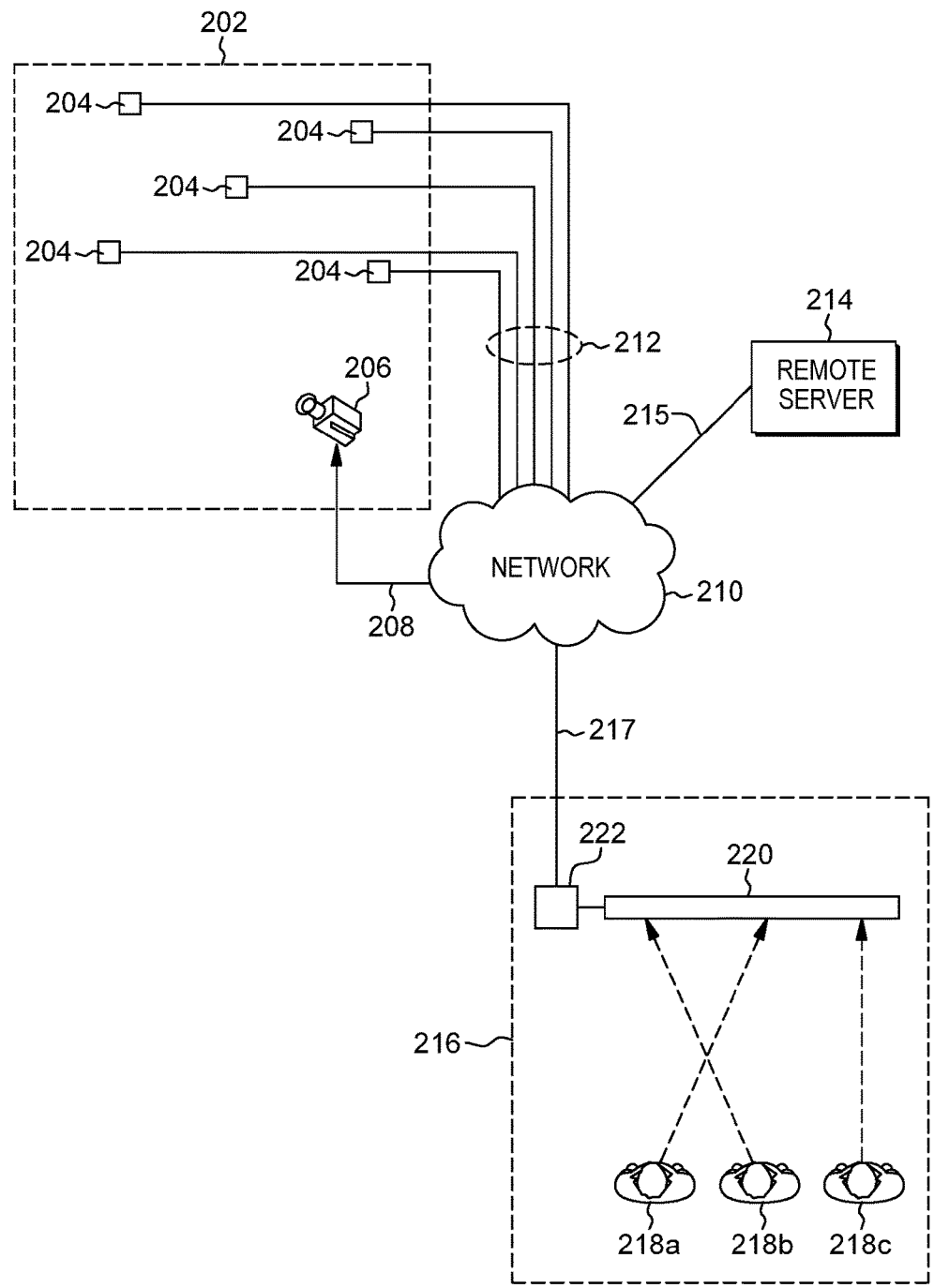
FIG. 2 depicts an example environment for tailored audio stream delivery, in accordance with aspects described herein.

FIG. 2 depicts an example environment for tailored audio stream delivery, in accordance with aspects described herein. The example presents an overhead view of an environment not drawn to scale. Tailored audio stream delivery is provided to users viewing content depicting scene(s) of one or more environment(s). In FIG. 2, 202 is an environment depicted in video content captured by video camera 206. Several microphones 204 are positioned at various locations within the environment. The microphones 204 capture individual audio streams from the corresponding different locations in the environment. These locations are different physical locations of that environment. Camera 206 captures the video of the scene to be presented to the users to form a video stream. The camera 206 and microphones 204 are coupled to a network 210 via communications paths 208 and 212, respectively. An example such network is a telecommunications network, such as the internet.

The audio streams are provided to a remote server 214 via communication path 215, where the streams may be processed in accordance with aspects described herein. The video stream provided by the camera may be delivered to a user location 216. In both cases, the audio and/or video streams may be delivered via intervening equipment of a content provider, cable provider, or other entity, and possibly after processing the stream(s).

At user location 216, video/audio content is provided via communications path 217 to a content receiving device 222, which provides the individual or combined streams to one or more video/audio components for presentation to users 218a, 218b, and 218c. Alternatively, the content receiving device may be incorporated directly into the one or more components. In this example, content receiving device 222 provides the video portion to a television 220 viewed by users 218a, 218b, 218c. Examples of content receiving devices are set-top boxes (e.g. "cable boxes"), tuners that may or may not be incorporated directly into the television, or streaming deices like the Roku Streaming Player line of devices offered by Roku Inc., Saratoga, Calif., U.S.A., or the Chromecast digital media player offered by Google Inc., Mountain View, Calif., U.S.A. In addition to providing the video stream, the content receiving device may also provide to the television 220 or a separate audio system (not depicted) a broadcasted audio stream initially bundled with the video stream.

The display 220 presents the video stream showing a scene of environment 202 to users 218a, 218b, and 218c. The users 218a, 218b, 218c direct their focus to different areas of the display, and therefore to different areas of the scene being shown. These different areas being viewed correlate to different areas of the environment in which the microphones present in the physical environment are located. The dashed lines represent the viewing directions (show from overhead) of the three users. The viewing directions are the lines of sight of users 218a, 218b, and 218c.

In accordance with aspects described herein, users 218a, 218b, 218c have the opportunity to receive audio streams captured from different microphones 204 in the environment 202. Different users may receive different audio streams captured from different such microphones. In this regard, the content receiving device 222 may be equipped to receive and deliver the different audio streams to the different users who are utilizing separate audio playback devices (headphones, speakers, etc.). Audio delivery may be accomplished over wired or wireless communications paths. In one example, each user is equipped with a Bluetooth® device capable of receiving a Bluetooth® audio stream, and content receiving device 222 is configured to pair with each such user Bluetooth® device and separately provide a selected audio stream of the several captured by microphones 204 to the appropriate user(s) (BLUETOOTH is a registered trademark of Bluetooth SIG, Inc., Kirkland, Wash., U.S.A.). As explained further herein, the content receiving device 222 can communicate with remote server 214 and/or microphones 204 to obtain audio stream(s) to deliver to the users. In one embodiment, the content receiving device provides to the remote server an indication of area(s) of the scene being viewed by the user(s) and the remote server selects appropriate audio streams to deliver to each user based on the area that each user is currently viewing. Alternatively, several of the available audio streams are delivered together by the remote server 214 to the content receiving device 222, and the content receiving device provides the appropriate audio stream to each connected user.

An overview is now provided of an example of tailored audio stream delivery. Initially, audio is captured at multiple locations in an environment as video of the environment is captured. Audio is captured using a plurality of microphones positioned at various physical locations in the environment. In some examples, the microphones comprise microphones on smartphones or other mobile devices of people physically present in the environment. Additionally or alternatively, a broadcaster or other entity producing the content positions microphones around the environment to capture audio from different locations thereof.

The video content is provided to users for display on a TV, perhaps with a conventionally provided broadcasted audio stream. This content may be provided in real-time, such as is the case when broadcasting a live sporting event, or the content may be pre-recorded and broadcasted for the users at a later time and/or on-demand. A user's viewing direction to the TV screen is determined using, as one example, imaging technology to recognize the user's line of sight and correlate that to a spot on the TV where the user is looking. That spot is then correlated to an area of the scene of the environment, e.g. a particular physical location of that environment. A microphone may or may not be positioned at that physical location, however there will be one or more microphones at, or at least, near that area. Based on the determined viewing direction of the user to the television screen and based on detecting a triggering gesture, which may be a predefined hand gesture, the user is provided specific audio content captured at that point in time at or nearest the physical location.

For example, user A is watching TV and listening to the broadcasted audio content (e.g. play-by-play commentary of an American football game). The user identifies an interesting location in the scene and is interested in audio content at or near that location. The user performs the triggering gesture. Software in the TV and/or other device, such as the content receiving device, will identify the user's viewing direction to the TV screen and provide an indication of that direction to the remote server. The remote server will calculate an approximate geo-coordinate of the physical location in the environment by extrapolating from the user's viewing direction the area on the TV where the user is looking, and from that an area/object of the scene that the user views. This will indicate the physical location in the environment from which audio is desired. The remote server can then identify an audio stream obtained from that physical location or from a location nearest that physical location, and provide the audio stream to the content receiving device, television, or other receiving device for streaming to the user. In some examples, the capture of audio from a location is on-demand, where the remote server, after identifying a particular location from which audio is desired, will enable capture of audio from that location or a nearby location. For instance, it will enable a microphone to capture the audio and then will provide the stream to the user. In other examples, the microphone can continuously capture audio regardless of whether a user has requested audio from that microphone.

This approach can be repeated for several users viewing the TV. In this manner, different users can listen to different audio content based on their preference. User A is provided with one audio stream of audio content generated from location 1 in the environment and user B is provided an audio stream of audio contend generated from location 2 in the environment.

Software installed in the display device, component connected thereto, the remote server, or another device can suggest interesting areas for users to focus on to receive audio content generated from those areas. Indications of the interesting areas can be overlaid on TV content, and may be identified in any of various ways. As one example, the interesting areas may be based on user's preference. Users can indicate areas that are interesting and the system can build a user profile over time predicting which areas of other scenes may be of interest to the user. The profile can store user's interests for a particular show or movie, or can profile the user's interest based on user behavior with similar content and/or similar scenes. Additionally or alternatively, the system can take a global approach where it aggregates user profiles to learn areas that are statistically likely to be appealing to others. Based on audio/visual analysis, the system can detect a degree of interest in various audio content, and a user can discover interesting audio content by looking at these suggested areas.

In addition, users that are physically together and viewing the same display, or located remotely from one another but watching the same content, can share interesting viewpoints through gestures. When User A gazes at a particular spot and hears interesting audio, the user can perform a triggering gesture that is detected by a camera or sensor of the TV or other device. The TV informs other users by indicating on its display the area on the display where user A is currently looking. This can prompt other users to change their viewing direction so that their line of sight is to the area where user A is currently looking. Then, the particular audio that user A hears based on looking at that area will also be provided to the other users who have changed their line of sight to view that position.

In some embodiments, the remote server continuously captures the audio from the different audio capture devices in the environment and feeds it in bulk as multiple corresponding audio streams to the content receiving device or the TV. The content receiving device and/or the TV has installed software that determines (based on the lines of sight of the users) the audio that each user desires to hear and then provides the respective audio via the individual user's Bluetooth connection or other audio communications path. This approach in which all available audio streams are provided to the user site may be utilized to reduce the amount of network traffic otherwise utilized in sending indications back and forth between the site and the remote server of user lines of sight, areas of the environment that the users view, the physical locations from which streams are desired, and/or any other information needed to facilitate the provision of the audio streams tailored to each user.

In one specific example of the bulk approach above, additional audio bands (in addition to the broadcasted audio band) are added to, or otherwise provided with, the video signal. If a particular program has only one feed (the broadcasted audio), then that feed will be played. Otherwise, the program is provided with multiple audio feeds that are selectively provided to the viewing users according to the areas of the scene that those users view. There may be a default audio stream to use as the broadcasted audio stream. By way of specific example, this approach may be used with movie watching experiences where users may want to hear the main actor/dialogue at times but additionally/alternatively audio from other focused areas. The movie could include portions with a multi-audio feed where the theater or home movie equipment is smart and detects user lines of sight and movement. This may potentially be done by adding sensor(s) on 3D glasses or additional gadgets for eye position tracking and audio delivery.

Approaches described herein differ from other approaches in which multiple individual video files, perhaps with corresponding different audio portions, are shown together in a single display screen. For instance, any given video stream has only a single broadcasted audio stream associated therewith that will play regardless of which area of the scene of the environment in the video the user is viewing. In accordance with aspects described herein, the user's focus on a particular area of the scene that represents a physical location in the environment being depicted in the scene will be detected and dictate which audio content will be identified and provided to the user, and this will play automatically. The audio content is not part of the broadcasted audio per se, and may be captured and provided separate from the video signal and broadcasted audio conventionally incorporated with the video signal.

A user's eye focus direction is identified and the particular area of the display screen where the view is looking is determined. With performance of a pre-defined gesture, software will understand that the user desires additional/different audio content from an area of the scene depicted at the area where the user is looking. Software will extrapolate this viewing direction to determine geo-coordinates of the physical location, in the environment, where the user is looking in the scene. Then software will search for appropriate audio content that is generated at the physical geo-location (or audio capture point nearest thereto) at that point of time.

Approaches described herein apply to live or pre-recorded video. For pre-captured video, audio streams from different locations in the scene of the environment will also be captured and stored. Audio metadata can be linked with sections of the captured video. This may involve processing the captured video to link with the various available audio streams.

For live video, the luxury of post-processing the captured video/audio for linking is not available. The audio streams will not necessarily be stored, and may be selectively obtained and provided to users. In both the pre-recorded and live video cases, the user's viewing direction and particular area of the display being viewed by the user are identified and software will extrapolate the direction to determine the physical geo-coordinates (i.e. real-world geolocation) in the environment that the user is viewing. In this manner, the area of the TV screen display where the user is looking is correlated to a real word location, and in the live video case this is identified at runtime. The remote server, content receiving device, or another component will search for audio content that was, or is being, captured during that time (when video portion is/was captured) and nearest that geo-location. Once the appropriate audio stream is identified for provision to a user, the remote server, content receiving device, television, or other device with access to the audio stream will deliver that audio stream directly to the user's audio playback device, such as Bluetooth headphones. In some examples, the user audio playback device receives the stream directly from the remote server.

The above features can be implemented with live streaming as well as offline video. In the live streaming case, there may be no need for predefined linking of audio or microphone data with the video sections of the video file/stream. In other words, the tailored audio stream delivery is provided absent any predefinition of/predefining links between the audio stream/data and the video stream/data. According to aspects described herein, the video file/stream need not be processed or pre-processed for such predefined audio links.

In some embodiments, an audio stream can be gathered by crowdsourcing the audio capture, for example based on identifying a geolocation of interest to a user and activating audio capture at or near that location. In some examples, users with mobile devices are prompted and perhaps incentivized with promotions to activate an audio capture facility on their mobile device to obtain audio from their location and send it to the remote server. This prompt, incentive, and/or capture may be accomplished via a mobile application installed on their devices.

Initially, prior to triggering provision of a tailored audio stream to a requesting user, the user may be watching TV or other video content and listening to the broadcasted audio content via the user's individual Bluetooth device or via other speakers in the user's environment. If the user desires to listen to specific audio content based on the particular area of the scene that the user is focusing on, the user performs a gesture, such as a hand gesture. As an example, the gesture includes the user cupping the user's hand and placing it behind the user's ear. In other examples, the gesture is other user input, such as voice input or touch-based input, such as pressing a button on the user's Bluetooth or other audio playback device.

Software will identify a viewing direction of the user to the screen. That particular viewing direction will be extrapolated to geo-coordinates of the area of the scene of the environment being viewed. In some examples, the particular area of the screen at which the user's line of sight is directed will be identified and it will be determined what specific video content is shown at that area. That specific video content displays an area of scene of an environment being shown by the video. In the above examples, the area of the screen displays particular seats of a sports stadium being shown in the scene. The system is capable of determining which area of the scene (i.e. the seats in the sports stadium) are being shown at that area of the screen. Those seats are at a particular physical location in the stadium. Once the physical location is identified, appropriate audio content will be identified and delivered to the user. The identified audio stream can be provided for any desired duration. In some examples, it is provided at long as the user continues the triggering gesture. In other examples, it is provided until the user gestures for another audio stream or provides input to reset back to the broadcasted audio or another default stream.

Figure 3:
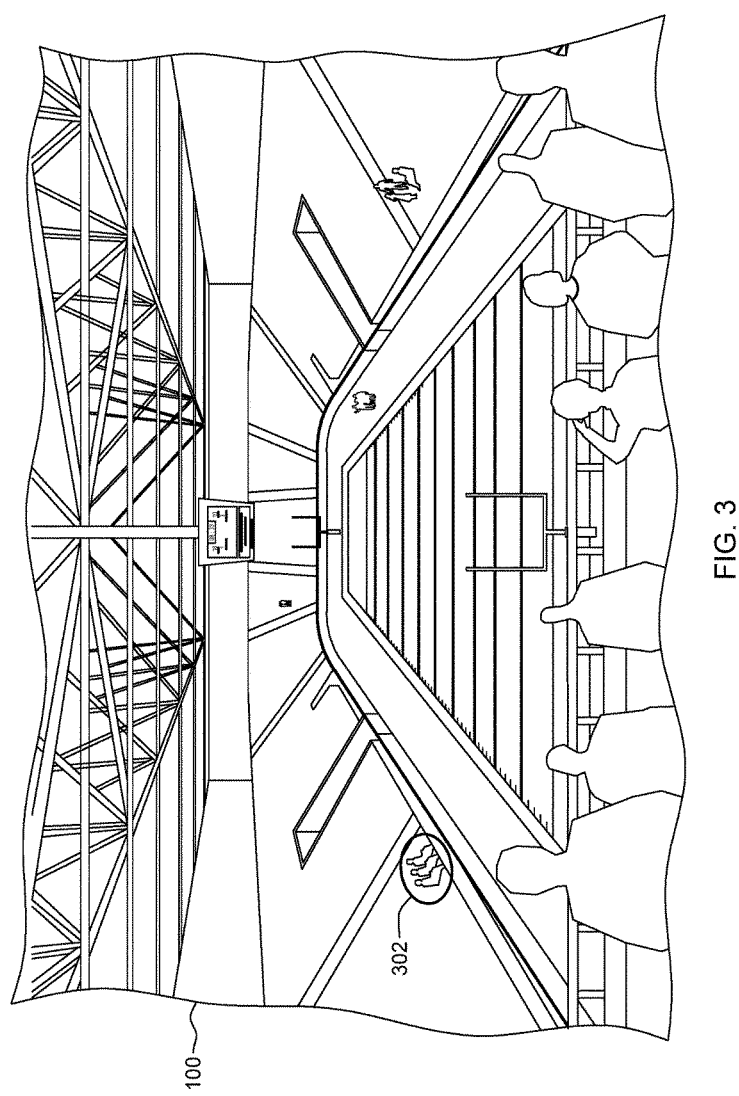
FIG. 3 illustrates identification of a potentially interesting area of the scene of a video stream, in accordance with aspects described herein.

To assist users in identifying areas of the scene for which potentially interesting audio content may be selectively provided to the user, interesting areas of the scene may be identified and indicated as an overlay to the video on the display screen. Interesting areas can be identified as metadata with pre-recorded or live content, and the TV or other display device can be configured to read that data and insert overlays to the content at the appropriate areas. FIG. 3 illustrates an example identification of a potentially interesting area of the scene of a video stream, in accordance with aspects described herein. FIG. 3 shows the scene of the environment 100 presented on the user's TV. Area 302 is identified as being a potentially interesting area associated with an audio stream of audio content gathered at or near the physical location of the environment at that area of the scene. In some embodiments, all locations, of the environment, from which audio is gathered may be identified as potentially interesting areas for the user. In other examples, the potentially interesting areas may be filtered according to user preferences. For instance, if a user rarely or never requests an audio stream from a location at or above the second level of a sports stadium, the system can refrain from indicating such audio capture locations. Additionally or alternatively, the user can set various preferences for these suggestions, for example to show suggested viewpoints only if the audio content associated therewith is highly interesting, or to not show any suggested viewpoints.

The display shows spots where a user could look for potentially interesting audio content though it is not a requirement that every such spot with audio be identified. Audio captured from a microphone could be analyzed and identified as interesting/non-interesting by training a binary classifier with tagged interest labels. Based on this trained interest binary classifier, software could identify areas in the video content where users could look to selectively hear interesting audio content. The remote server can analyze the source audio streams to recognize content thereof (words, dialogue, etc.) and characteristics of the audio (stream quality, volume, etc.), and can use that information to recommend audio streams, match with user profiles to identify streams likely to be of interest to them, and/or to filter audio streams for lack of interest or insufficient quality, as examples.

In another example, FIG. 3 illustrates how users can share interesting viewpoints (areas of the scene) with others. This is useful when a first user listens to an audio stream that the first user thinks may be interesting to other users. The system will recognize that the first user gazes at a particular area when the first user triggers provision of audio captured at/near that area. When the first user desires to inform the other users where on the screen the first user is looking to obtain the interesting audio, the first user performs a triggering gesture or supplies other input (voice, button, etc.) that is detected by the TV or other device. The TV or content receiving device, as examples, identifies which user (i.e. the first one) is indicating that his/her viewpoint is to be shared, and accordingly indicates on the display the area on the display where the first user's line of sight is/was directed to invoke provision of the audio stream associated with that area. In the example of FIG. 3, the first user has indicated that his/her view to the relevant area is to be shared with the other users. An indication 302 is provided on the display of the area, of the scene, being viewed by the first user. A tag or other indicator can also be provided to identify which users is viewing that area. If a second user changes his/her focus direction to view area 302 and (optionally) performs a gesture, the system identifies that the second user's viewing direction changed so that the second user's line of sight is directed to area 302. The particular audio associated with that area, which is also the audio that the first user hears, will also be provided to the second user and any other user who has changed his/her line of sight to view that position. The indication of the first user's viewpoint (area 302) can be configured to disappear after a set amount of time, so as to not interfere with the viewing experience of the users.

Figure 4:
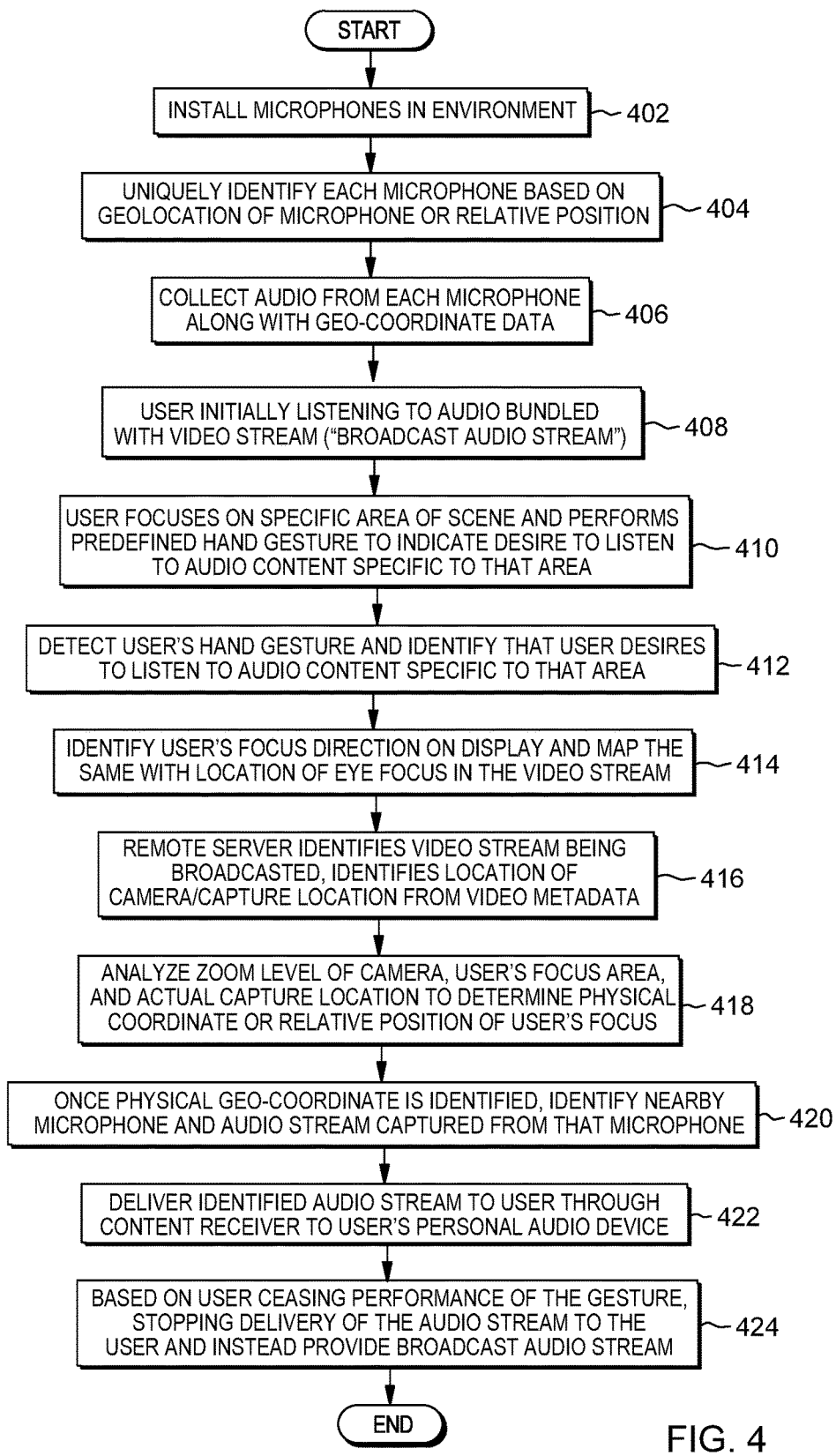
FIG. 4 depicts an example process for tailored audio stream delivery, in accordance with aspects described herein.

FIG. 4 depicts an example process for tailored audio stream delivery, in accordance with aspects described herein. Different microphones are installed in the environment or surroundings of a scene (402). The environment may be, as one example, a stadium, where multiple microphones are installed in different places of the stadium such as different seating sections, and different areas on, above or adjacent to the playing field. It is noted that microphones may be automatically or manually moved at any time and therefore their location may change.

Then each such microphone is identified uniquely based on geolocation of the microphone and/or its position relative to other object(s) of known location(s) (404). In some examples, a microphone is equipped with a GPS or other location determining device, or is included as part of a component with a location determining device. In embodiments where some audio streams are crowdsourced from devices of people in the environment, those devices may be equipped with a GPS device to provide the precise location of the device and therefore the position from which the corresponding audio stream is captured. As discussed above, volunteer or incentivized users can gather audio content using their mobile device and share that content with the remote server in real time or near real time (i.e. stream the audio near instantly to the remote server).

The respective audio feed from each microphone is collected along with the geo-coordinate data corresponding to the microphone's location (406). Initially, the user is listening to the audio bundled with the video stream (408), for instance via a Bluetooth audio received to listen to broadcasted audio content. Then, if user wants to listen to an audio stream tailored to that particular user and specifically based on where the user is looking, the user focuses his/her viewing direction on a specific area of the scene and performs a hand gesture to indicate a desire to listen to audio content specific to that area of the scene (410).

One or more cameras and/or sensors installed in the TV or in the user's Bluetooth device, as examples, will detect the user's hand gesture and identify that the user desires to listen to audio content specific to that area (412). One or more cameras or gaze point tracker(s) of the TV, content receiving device, or other device identifies the user's focus direction on the display and maps the same with location of the user's eye focus in the video frame (414). A remote server identifies the video stream being broadcasted, and identifies the physical location of the camera/capture location from video metadata (416). Then, the remote server will analyze the zoom level of the camera, the user's focus area, and the actual capture location (of the camera) and determine the physical coordinate or relative position of the user's focus (418). The zoom level may be used to help compute the actual location of the point at which the user is focused. It is known from where the camera is capturing the scene, based on GPS location of the camera for example, indicated by a GPS incorporated into or with the camera. Meanwhile, it can be identified where on the screen the user is looking. However, if the camera or the TV has zoomed in, it may be difficult to gauge distance between the physical location of the camera in the environment and the physical location where the user is looking in the scene of the environment. With an indication of whatever zoom (if any) is being applied, that is used to determine the geolocation of the physical location the user views.

Once the physical geo-coordinate where the user focuses is identified, software will identify a nearby microphone and audio stream captured by that microphone (420). If audio from a nearby location has not been captured, an individual in the environment can be alerted (e.g. via an app notification, or a billboard at a stadium) to participate.

The combination of the video stream and the audio stream delivered via a Bluetooth device may be identified uniquely by the remote server. A single TV or content receiving device can have multiple Bluetooth users connected thereto with different audio channels associated with each such connected user.

Once the appropriate audio content is identified, the remote server/other device will deliver the audio content to the user's personal audio playback device (422). This is delivered directly to the user's audio playback device in some examples where the two are directly networked together, or is delivered to the user's personal audio playback device via a set-top-box or other content receiving device.

Based on the user ceasing performance of the gesture, delivery of the audio stream to the user is stopped, and the broadcasted audio content will be provided to the user at that point (424). In this manner, delivery of the tailored audio stream may be temporary and based on the user continually performing the gesture. In other examples, the triggering gesture triggers provision of the tailored audio stream, and the user must perform the same or different gesture in order to switch to another tailored audio stream or back to the broadcasted audio.

Described herein are aspects providing tailored audio stream delivery. This is accomplished in part through real-time extrapolation of a user's viewing direction toward an area of display screen into a real world physical location in an environment being shown in the scene displayed, and based, in part, on analyzing the images of the video content displayed on the screen and correlating image areas to the physical locations in the environment. Based on the user's viewing direction, software will identify the geolocation of the area, in the environment, viewed by the user and will deliver an appropriate audio stream. Audio streams can be gathered from pre-positioned microphones, microphones positioned at particular areas based on/after user demand for audio from those areas, and/or crowdsourcing from, e.g., user mobile devices, as examples.

Additional aspects described herein include delivering tailored audio streams to user's individual audio playback devices, such as Bluetooth-equipped devices. This may be triggered based on a user gesture. Additionally or alternatively, the audio streams may be delivered directly to those devices (i.e. from a remote server to the user devices, which are connected to the internet), rather than delivering them through the TV or other device presenting the video content. This enables multiple user in a same room to hear different sounds based on their viewing directions. Software identifies the users' viewing directions and streams the appropriate audio to the user's Bluetooth or other audio playback devices.

In addition, aspects described herein suggest interesting viewpoints overlaid on the video content based on user's preferences. The viewpoints indicate areas of the scene that may be of interest to viewing users. A viewing user can look at a suggested viewpoint to trigger provision of audio content associated therewith. Based on audio/visual analysis (e.g. by training and leveraging classifiers), the degree of interest in various audio content can be detected to inform subsequent recommendations about how interesting particular audio may be to users.

A first user can also recommend viewpoints to other users who may be located in the same room as the first user, or who may be located elsewhere. When the first user gazes to a particular area of the scene and desires to notify others of the audio stream associated therewith, the first user can perform a predefined gesture that is detected by the TV or other device. The area of the scene corresponding to the user's viewing direction can then be shown with an overlay (for instance) to the video content. This may be overlaid over video content on the display being viewed by the first user (so that others in the room will know where the first user is looking), or it may be overlaid over the video content on other displays of other users who may be located remote from the first user. Either way, the system is able to identify the particular area of the scene being viewed by the first user and can indicate that to anyone else viewing that video content. In some examples, such areas being viewed may be stored as metadata associated with the video content, and presented with later viewings of the video content.

Processes are described herein for providing tailored audio stream delivery. In some examples, the processes are performed, in whole or in part, by one or more devices in communication with or incorporating a display that presents video content. Example such devices are a television, a remote server, or a content receiving device, which can incorporate or use computer systems including a processor and memory for performing aspects of the processing. Also, mobile devices, such as tablets and smartphones, and other computing devices that have displays may perform processes described herein.

Figure 5A:
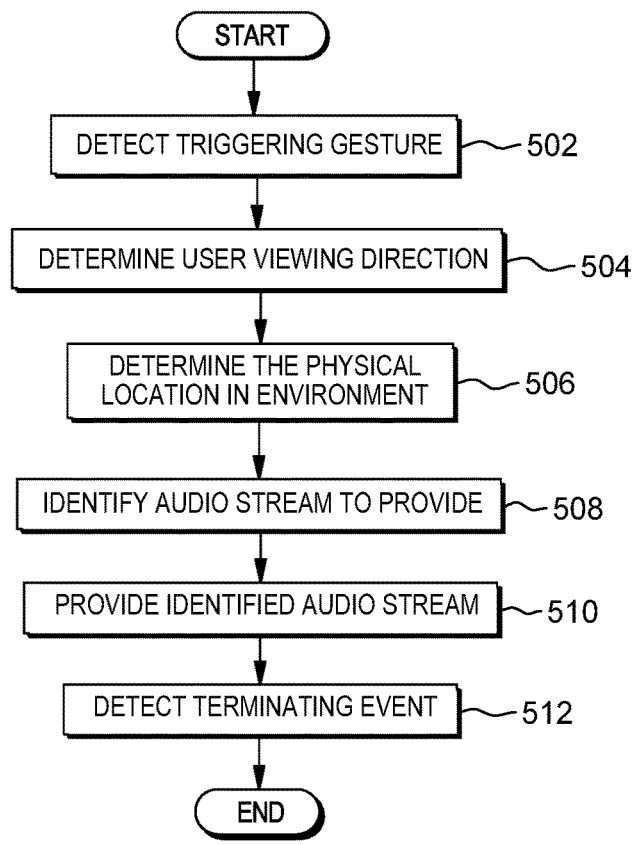
FIG. 5A depicts another example process for tailored audio stream delivery, in accordance with aspects described herein.

An example process is described initially with reference to FIG. 5A. In FIG. 5, a video stream is broadcast with a broadcast audio stream, and the user initially listens to that broadcast stream, or a different audio stream. The process begins with detecting a request for provision of a tailored audio stream. The detecting is based at least in part on recognizing that the user performs a triggering gesture. The triggering gesture may be a predefined gesture. The process detects the triggering gesture (502) and determines a viewing direction of the user to a display that is presenting the video stream (504). This can be determined using cameras, proximity devices, or any of a variety of other sensors to ascertain the user's viewing direction and line of sight. The video stream shows a scene of an environment. Based at least in part on that determined viewing direction of the user, the process determines a physical location, in the environment, that the user is viewing in the scene of the environment (506).

The determination of the physical location may be further based on a geolocation of a device capturing the video stream showing the scene of the environment and based on a zoom level of the device capturing the video stream, where determining the physical location includes correlating a line of sight of the user ascertained from the determined viewing direction to an area of the scene shown by the video stream presented on the display, and then extrapolating a distance from the device capturing the video stream to an object in the environment shown in the area of the scene. The zoom level is accounted for in this extrapolating, and the physical location includes a geolocation in the environment.

The process of FIG. 5A continues by identifying an audio stream, of a plurality of audio streams obtained from different physical locations in the environment, that correlates to the determined physical location that the user is viewing (508). The correlation may be to an audio stream captured at that physical location or nearer that location than any of the other audio streams of the plurality of audio streams. Thus, identifying the audio stream can include selecting the audio stream, of the plurality of audio streams, that is captured from a location in the environment nearest the determined physical location.

In some examples, one or more audio streams of the plurality of audio streams are crowdsourced from electronic devices of multiple individuals physically present in the environment. In this regard, these individuals may be prompted to activate audio capture on their devices in order to supply the audio stream(s). Thus, processing may include identifying a geolocation, in the environment, from which an audio stream is to be obtained, then prompting an individual, of the multiple individuals, at or near the geolocation to capture an audio stream from the location of the individual using an electronic device of the individual, and obtaining, based on the prompting, an audio stream from the location of that individual via the electronic device of the individual.

Once the audio stream to provide is identified, it is then provided to the user (510).

Accordingly, provision of the audio stream and others aspects of the process (502-508) may be triggered based on recognizing that the user performs the predefined triggering gesture. In some examples, provision of the audio stream to the user continues until another, terminating, event is detected (512), which may be the same gesture as the triggering gesture, or a different gesture or event. In one particular example, the terminating event is the user ceasing to perform the predefined user gesture. The predefined gesture may be one that the user continually performs to hear the tailored audio, such as cupping the user's hand behind the ear. The terminating event may be the user removing his/her hand from the ear in this case. Alternatively, the terminating event may be a timeout or recognition of performance of another user gesture by the user. The process, based on detecting the terminating event, ceases provision of the audio stream to the user, and may commence provision of another audio stream, such as the broadcast audio stream or another default stream, to the user.

In some examples, the video stream includes a broadcast of a live event in real-time, where determining the viewing direction, determining the physical location, and identifying the audio stream are performed in real-time as the live event is broadcast.

The user may be a first user of a plurality of users viewing the video stream. The process can further include repeating, for each other user of the plurality of users, the determining a viewing direction, the determining a physical location, the identifying an audio stream, and the providing the audio stream, where the first user and at least one other user of the plurality of users view different physical locations in the environment and are provided different audio streams of the plurality of audio streams. In these examples, the users may or may not be viewing the video stream on the same display.

Figure 5B:
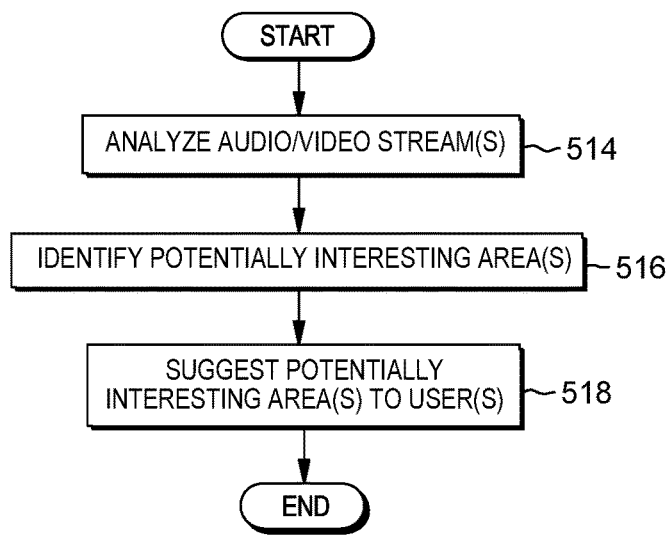
FIG. 5B depicts an example process for suggesting potentially interesting areas of a scene to a user, in accordance with aspects described herein.

In accordance with further aspects described herein, potentially interesting areas of a scene are suggested, an example process of which is provided with reference to FIG. 5B. The process analyzes at least one of the video stream or the plurality of audio streams (514) and identifies potentially interesting area(s) of the video stream, e.g. areas for which potentially interesting audio exists (516). The process then suggests to the user one or more potentially interesting areas of the scene of the video stream presented on the display (518) based on this analysis. The potentially interesting area(s) are each associated with a respective audio stream of the plurality audio streams and indicated on the display as an overlay to the video stream presented on the display.

The determination of the potentially interesting area(s) can be based on a user profile indicating user-specific preferences as to preferred audio streams. In this regard, the process can further include determining the potentially interesting area(s) based on prior history of the user viewing the video stream or other video streams having one or more identified characteristics in common with the video stream. Example characteristics include similar or same content, programming, genre, characters, actors, or themes as examples.

Figure 5C:
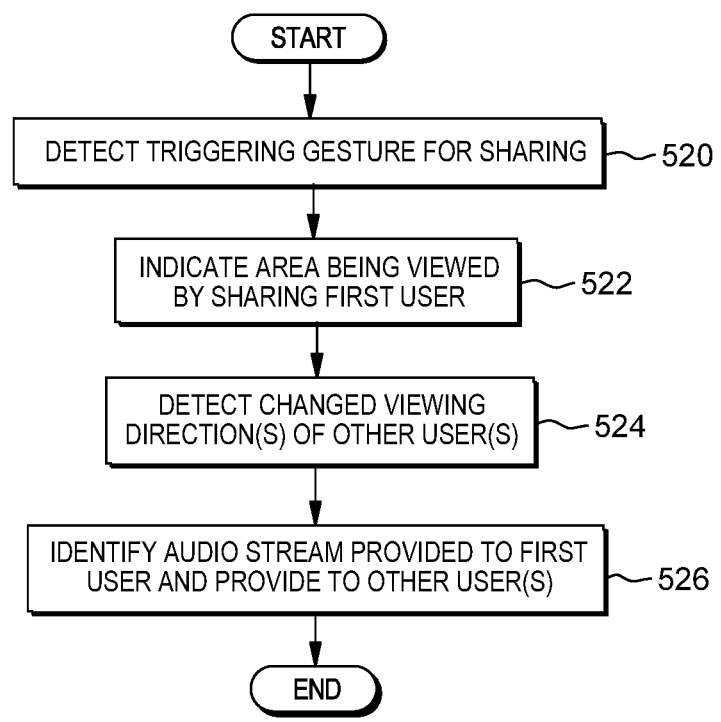
FIG. 5C depicts an example process for sharing an audio stream in accordance with aspects described herein.

In further aspects, processes are provided for sharing an audio stream, an example of which is provided with reference to FIG. 5C. A first user views an area of the scene in which a physical location is depicted. The process detects a triggering gesture for sharing an audio stream (520) by recognizing that the first user performs a predefined user gesture that is associated with a recommendation action to recommend to one or more other users of the plurality of users the area of the scene being viewed by the first user. Based on recognizing that the first user preforms the predefined user gesture, the process indicates on the display (or another display), for view by the one or more other users, the area of the scene being viewed by the first user as a recommended area for the one or more other users to view (522). Then the process detects changed viewing direction (s) of other users to view the indicated area of the scene being viewed by the first user (524). Based on a second user of the one of more other users changing the second user's viewing direction to view the recommended area of the scene being viewed by the first user (and optionally after the second user performs a triggering gesture), the audio being provided to the first user is identified and provided to the second user (526).

Processes described herein may be performed singly or collectively by one or more computer systems, such as computer system(s) described below with reference to FIG. 6. In some embodiments, such a computer system may have, use, be in communication with, or be incorporated into a physical display on which video content with corresponding audio content is presented to users. A content receiving device or television as explained above may be, or incorporate, a computer system.

Figure 6:
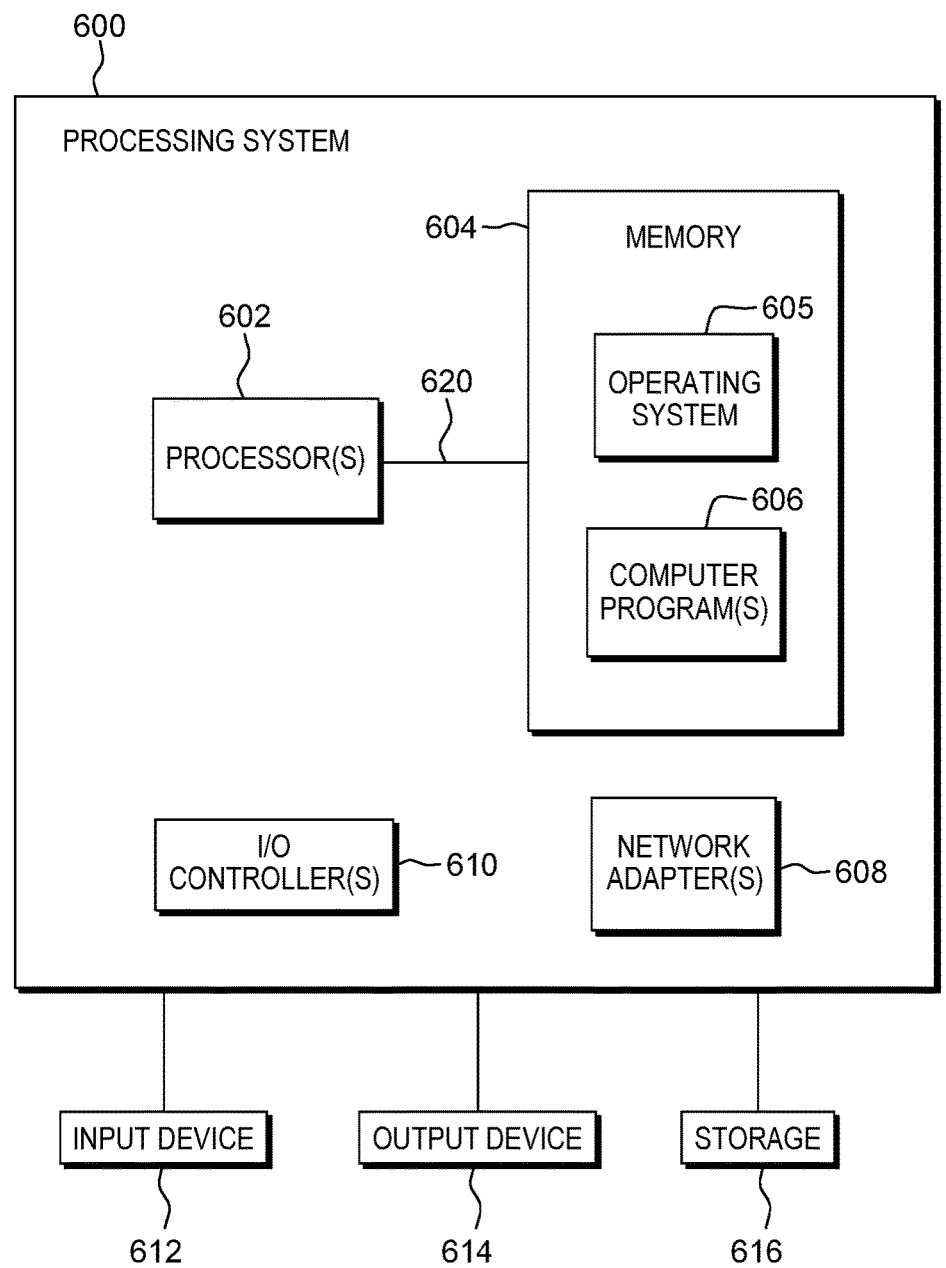
FIG. 6 depicts an example of a computer system to incorporate or use aspects described herein.

FIG. 6 depicts one example of a computer system to incorporate and use aspects described herein. A computer system may also be referred to herein as a processing device/system or computing device/system, or simply a computer. Computer system 600 may be based on one or more of various system architectures such as those offered by International Business Machines Corporation (Armonk, N.Y., USA) or Intel Corporation (Santa Clara, Calif., USA), as examples.

Computer system 600 is suitable for storing and/or executing program code and includes at least one processor 602 coupled directly or indirectly to memory 604 through, e.g., a system bus 620. In operation, processor(s) 602 obtain from memory 604 one or more instructions for execution by the processors. Memory 604 may include local memory employed during actual execution of the program code, bulk storage, and cache memories which provide temporary storage of at least some program code in order to reduce the number of times code must be retrieved from bulk storage during program code execution. A non-limiting list of examples of memory 604 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 604 includes an operating system 605 and one or more computer programs 606, for instance programs to perform aspects described herein.

Input/Output (I/O) devices 612, 614 (including but not limited to displays, microphones, speakers, accelerometers, gyroscopes, magnetometers, light sensors, proximity sensors, GPS devices, cameras, etc.) may be coupled to the system either directly or through I/O controllers 610.

Network adapter(s) 608 may also be coupled to the system to enable the computer system to become coupled to other computer systems, storage devices, or the like through intervening private or public networks. Ethernet-based (such as Wi-Fi) interfaces and Bluetooth® adapters are just examples of the currently available types of network adapters 608 used in computer systems.

Computer system 600 may be coupled to storage 616 (e.g., a non-volatile storage area, such as magnetic disk drives, optical disk drives, a tape drive, etc.), having one or more databases. Storage 616 may include an internal storage device or an attached or network accessible storage. Computer programs in storage 616 may be loaded into memory 604 and executed by a processor 602 in a manner known in the art.

The computer system 600 may include fewer components than illustrated, additional components not illustrated herein, or some combination of the components illustrated and additional components. Computer system 600 may include any computing device known in the art, such as a mainframe, server, personal computer, workstation, laptop, handheld or mobile computer, tablet, wearable device, telephony device, network appliance (such as an edge appliance), virtualization device, storage controller, etc.

Figure 7:
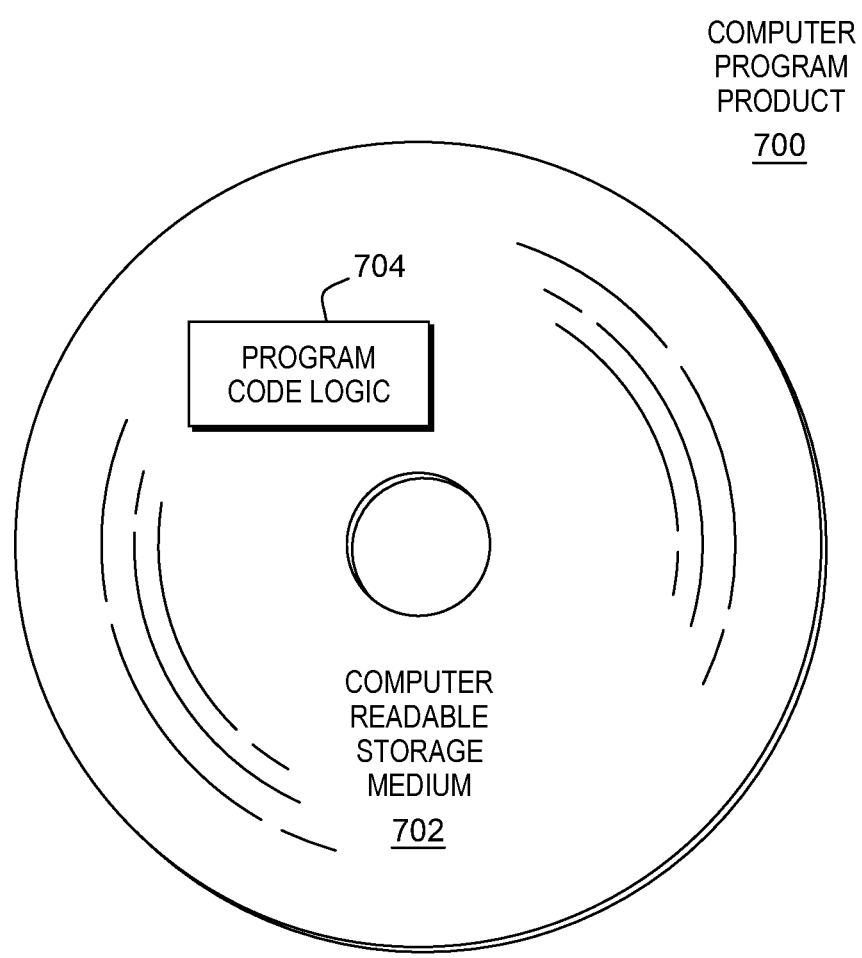
FIG. 7 depicts one embodiment of a computer program product.

Referring to FIG. 7, in one example, a computer program product 700 includes, for instance, one or more computer readable storage media 702 to store computer readable program code means, logic and/or instructions 704 thereon to provide and facilitate one or more embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    determining a viewing direction of a user to a display presenting a video stream showing a scene of an environment;
    based at least in part on the determined viewing direction of the user, determining a physical location, in the environment, that the user is viewing in the scene of the environment, wherein the determining the physical location is further based on a geolocation of a device capturing the video stream showing the scene of the environment and based on a zoom level of the device capturing the video stream, wherein the determining the physical location comprises correlating a line of sight of the user ascertained from the determined viewing direction to an area of the scene shown by the video stream presented on the display, and extrapolating a distance from the device capturing the video stream to an object in the environment shown in the area of the scene, wherein the zoom level is accounted for in the extrapolating, and the physical location comprises a geolocation in the environment;
    identifying an audio stream, of a plurality of audio streams obtained from different physical locations in the environment, that correlates to the determined physical location that the user is viewing; and
    providing the identified audio stream to the user.

2. The method of claim 1, wherein the video stream comprises a broadcast of a live event in real-time, and wherein the determining the viewing direction, the determining the physical location, and the identifying the audio stream are performed in real-time as the live event is broadcast.

3. The method of claim 1, further comprising recognizing that the user performs a predefined user gesture, and triggering the providing the audio stream based at least in part on the recognizing that the user performs the gesture.

4. The method of claim 3, wherein the video stream is broadcast with a broadcast audio stream, and wherein based on the user ceasing to perform the predefined user gesture or based on recognizing performance of another user gesture by the user, ceasing provision of the audio stream to the user and commencing provision of the broadcast audio stream to the user.

5. The method of claim 1, wherein the user is a first user of a plurality of users viewing the video stream, and wherein the method further comprises repeating, for each other user of the plurality of users, the determining a viewing direction, the determining a physical location, the identifying an audio stream, and the providing the audio stream, wherein the first user and at least one other user of the plurality of users view different physical locations in the environment and are provided different audio streams of the plurality of audio streams.

6. The method of claim 5, wherein the first user views an area of the scene in which the physical location is depicted, and wherein the method further comprises:
    recognizing that the first user performs a predefined user gesture, the predefined user gesture associated with a recommendation action to recommend to one or more other users of the plurality of users the area of the scene being viewed by the first user;
    based on recognizing that the first user preforms the predefined user gesture, indicating on the display, for view by the one or more other users, the area of the scene being viewed by the first user as a recommended area for the one or more other users to view; and
    based on a second user of the one of more other users changing viewing direction to view the indicated area of the scene being viewed by the first user, providing to the second user the audio stream being provided to the first user.

7. The method of claim 1, wherein the identifying the audio stream comprises selecting the audio stream, of the plurality of audio streams, that is captured from a location in the environment nearest the determined physical location.

8. The method of claim 1, further comprising suggesting to the user one or more potentially interesting areas of the scene of the video stream presented on the display based on analyzing at least one of the video stream or the plurality of audio streams, the one or more potentially interesting areas each being associated with a respective audio stream of the plurality audio streams and being indicated on the display as an overlay to the video stream presented on the display.

9. The method of claim 8, wherein the method further comprises determining the one or more potentially interesting areas based on a user profile indicating user-specific preferences as to preferred audio streams.

10. The method of claim 8, wherein the method further comprises determining the one or more potentially interesting areas based on prior history of the user viewing the video stream or other video streams having one or more identified characteristics in common with the video stream.

11. The method of claim 1, wherein the plurality of audio streams are crowdsourced from electronic devices of multiple individuals physically present in the environment.

12. The method of claim 11, wherein the method further comprises:
    identifying a geolocation, in the environment, from which an audio stream is to be obtained;
    prompting an individual, of the multiple individuals, at or near the geolocation to capture an audio stream from the location of the individual using an electronic device of the individual; and
    obtaining, based on the prompting, an audio stream from the location of that individual via the electronic device of the individual, wherein the audio stream from the location is one audio stream of the plurality of audio streams.

13. A computer program product comprising:
a non-transitory computer readable storage medium readable by a processor and storing instructions for execution by the processor for performing a method comprising:
   determining a viewing direction of a user to a display presenting a video stream showing a scene of an environment;
   based at least in part on the determined viewing direction of the user, determining a physical location, in the environment, that the user is viewing in the scene of the environment, wherein the determining the physical location is further based on a geolocation of a device capturing the video stream showing the scene of the environment and based on a zoom level of the device capturing the video stream, wherein the determining the physical location comprises correlating a line of sight of the user ascertained from the determined viewing direction to an area of the scene shown by the video stream presented on the display, and extrapolating a distance from the device capturing the video stream to an object in the environment shown in the area of the scene, wherein the zoom level is accounted for in the extrapolating, and the physical location comprises a geolocation in the environment;
   identifying an audio stream, of a plurality of audio streams obtained from different physical locations in the environment, that correlates to the determined physical location that the user is viewing; and
   providing the identified audio stream to the user.

14. The computer program product of claim 13, wherein the video stream comprises a broadcast of a live event in real-time, and wherein the determining the viewing direction, the determining the physical location, and the identifying the audio stream are performed in real-time as the live event is broadcast.

15. The computer program product of claim 13, wherein the user is a first user of a plurality of users viewing the video stream, wherein the first user views an area of the scene in which the physical location is depicted, and wherein the method further comprises:
   repeating, for each other user of the plurality of users, the determining a viewing direction, the determining a physical location, the identifying an audio stream, and the providing the audio stream, wherein the first user and at least one other user of the plurality of users view different physical locations in the environment and are provided different audio streams of the plurality of audio streams;
   recognizing that the first user performs a predefined user gesture, the predefined user gesture associated with a recommendation action to recommend to one or more other users of the plurality of users the area of the scene being viewed by the first user;
   based on recognizing that the first user preforms the predefined user gesture, indicating on the display, for view by the one or more other users, the area of the scene being viewed by the first user as a recommended area for the one or more other users to view; and
   based on a second user of the one of more other users changing viewing direction to view the indicated area of the scene being viewed by the first user, providing to the second user the audio stream being provided to the first user.

16. The computer program product of claim 13, wherein the method further comprises suggesting to the user one or more potentially interesting areas of the scene of the video stream presented on the display based on analyzing at least one of the video stream or the plurality of audio streams, the one or more potentially interesting areas each being associated with a respective audio stream of the plurality audio streams and being indicated on the display as an overlay to the video stream presented on the display.

17. A computer system comprising:
a memory; and
a processor in communications with the memory, wherein the computer system is configured to perform a method, the method comprising:
   determining a viewing direction of a user to a display presenting a video stream showing a scene of an environment;
   based at least in part on the determined viewing direction of the user, determining a physical location, in the environment, that the user is viewing in the scene of the environment, wherein the determining the physical location is further based on a geolocation of a device capturing the video stream showing the scene of the environment and based on a zoom level of the device capturing the video stream, wherein the determining the physical location comprises correlating a line of sight of the user ascertained from the determined viewing direction to an area of the scene shown by the video stream presented on the display, and extrapolating a distance from the device capturing the video stream to an object in the environment shown in the area of the scene, wherein the zoom level is accounted for in the extrapolating, and the physical location comprises a geolocation in the environment;
   identifying an audio stream, of a plurality of audio streams obtained from different physical locations in the environment, that correlates to the determined physical location that the user is viewing; and
   providing the identified audio stream to the user.

18. The computer system of claim 17, wherein the video stream comprises a broadcast of a live event in real-time, and wherein the determining the viewing direction, the determining the physical location, and the identifying the audio stream are performed in real-time as the live event is broadcast.

19. The computer system of claim 17, wherein the user is a first user of a plurality of users viewing the video stream, wherein the first user views an area of the scene in which the physical location is depicted, and wherein the method further comprises:
   repeating, for each other user of the plurality of users, the determining a viewing direction, the determining a physical location, the identifying an audio stream, and the providing the audio stream, wherein the first user and at least one other user of the plurality of users view different physical locations in the environment and are provided different audio streams of the plurality of audio streams;
   recognizing that the first user performs a predefined user gesture, the predefined user gesture associated with a recommendation action to recommend to one or more other users of the plurality of users the area of the scene being viewed by the first user;

based on recognizing that the first user preforms the predefined user gesture, indicating on the display, for view by the one or more other users, the area of the scene being viewed by the first user as a recommended area for the one or more other users to view; and based on a second user of the one of more other users changing viewing direction to view the indicated area of the scene being viewed by the first user, providing to the second user the audio stream being provided to the first user.

\* \* \* \* \*